US009312968B2

United States Patent
Choi et al.

(10) Patent No.: US 9,312,968 B2
(45) Date of Patent: Apr. 12, 2016

(54) COMPUTING SYSTEM WITH POWER ESTIMATION MECHANISM AND METHOD OF OPERATION THEREOF

(71) Applicant: Samsung Electronics Co., Ltd., Suwon-si, Gyeonggi-Do (KR)

(72) Inventors: Yoo Jin Choi, San Diego, CA (US); Dongwoon Bai, San Diego, CA (US); Jungwon Lee, San Diego, CA (US); Inyup Kang, San Diego, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 14/297,327

(22) Filed: Jun. 5, 2014

(65) Prior Publication Data

US 2014/0362954 A1 Dec. 11, 2014

Related U.S. Application Data

(60) Provisional application No. 61/832,732, filed on Jun. 7, 2013.

(51) Int. Cl.
*H03M 5/02* (2006.01)
*H04B 17/345* (2015.01)
*H04L 25/06* (2006.01)

(52) U.S. Cl.
CPC ............ *H04B 17/345* (2015.01); *H04L 25/067* (2013.01)

(58) Field of Classification Search
CPC ..... H04L 1/005; H04L 1/0045; H04L 1/0054; H03M 13/41; H03M 5/02

USPC .................. 375/267, 299, 340–341, 347–350
See application file for complete search history.

(56) References Cited

U.S. PATENT DOCUMENTS

| | | | |
|---|---|---|---|
| 6,816,470 B2 | 11/2004 | Kim et al. | |
| 7,212,593 B2 * | 5/2007 | He | 375/346 |
| 7,366,088 B2 * | 4/2008 | Bolinth et al. | 370/203 |
| 7,421,041 B2 * | 9/2008 | Khandekar et al. | 375/316 |
| 7,555,067 B2 * | 6/2009 | Jeong | 375/340 |
| 7,567,635 B2 * | 7/2009 | Scheim et al. | 375/341 |
| 7,643,438 B2 * | 1/2010 | Lee et al. | 370/310.2 |
| 7,643,548 B2 * | 1/2010 | Hafeez | 375/229 |
| 7,809,089 B2 * | 10/2010 | Kuroyanagi et al. | 375/335 |
| 7,852,964 B2 * | 12/2010 | Rajappan et al. | 375/267 |
| 7,860,502 B2 * | 12/2010 | Kim et al. | 455/436 |
| 8,009,777 B2 * | 8/2011 | Andrews et al. | 375/346 |
| 8,050,621 B2 | 11/2011 | Ku et al. | |

(Continued)

OTHER PUBLICATIONS

Sangwon Seo, "Energy-Efficient Computing for Mobile Signal Processing", University of Michigan, http://web.eecs.umich.edu/~tnm/trev_test/dissertationsPDF/sangwonS.pdf, 2011.

(Continued)

*Primary Examiner* — Emmanuel Bayard
(74) *Attorney, Agent, or Firm* — IP Investment Law Group

(57) ABSTRACT

A computing system includes: an antenna configured to receive a receiver signal for representing a serving signal and an interference signal; a communication unit, coupled to the antenna, configured to: calculate a signal likelihood from the receiver signal based on a Gaussian approximation mechanism; calculate an interference power estimate based on the signal likelihood for characterizing the interference signal; and estimating the serving signal based on the interference power estimate.

19 Claims, 5 Drawing Sheets

(56) References Cited

U.S. PATENT DOCUMENTS

| | | | |
|---|---|---|---|
| 8,144,748 B2* | 3/2012 | Yellin | 375/147 |
| 8,149,957 B2* | 4/2012 | Oh et al. | 375/340 |
| 8,190,207 B2* | 5/2012 | Labbe et al. | 455/561 |
| 8,199,794 B2* | 6/2012 | Bauch et al. | 375/211 |
| 8,238,487 B2* | 8/2012 | Lou et al. | 375/341 |
| 8,243,860 B1* | 8/2012 | Lee et al. | 375/346 |
| 8,265,205 B2* | 9/2012 | Pedersen et al. | 375/341 |
| 8,300,520 B2 | 10/2012 | Kim et al. | |
| 8,385,479 B2* | 2/2013 | Lee et al. | 375/341 |
| 8,412,260 B2 | 4/2013 | Rave | |
| 8,582,703 B2* | 11/2013 | Luschi | H04W 52/225 370/252 |
| 8,612,502 B2* | 12/2013 | Budianu et al. | 708/290 |
| 8,654,902 B2* | 2/2014 | Lee et al. | 375/340 |
| 8,654,910 B1* | 2/2014 | Lee et al. | 375/346 |
| 8,705,666 B2* | 4/2014 | Thian et al. | 375/340 |
| 8,787,426 B2* | 7/2014 | Wang | H04B 1/00 375/142 |
| 8,787,483 B1* | 7/2014 | Sun et al. | 375/267 |
| 8,804,883 B2* | 8/2014 | Khayrallah | 375/346 |
| 8,811,545 B2* | 8/2014 | Annavajjala et al. | 375/341 |
| 8,831,147 B1* | 9/2014 | Jacob et al. | 375/340 |
| 8,842,764 B2* | 9/2014 | Werner et al. | 375/267 |
| 8,848,838 B1* | 9/2014 | Lee et al. | 375/329 |
| 8,873,684 B2* | 10/2014 | Lee et al. | 375/346 |
| 8,891,657 B2* | 11/2014 | Medbo et al. | 375/267 |
| 8,995,499 B2* | 3/2015 | Reial | H04L 1/0003 375/130 |
| 2005/0250466 A1* | 11/2005 | Varma et al. | 455/296 |
| 2005/0259006 A1 | 11/2005 | Kim et al. | |
| 2006/0198292 A1* | 9/2006 | Yoshii et al. | 370/208 |
| 2007/0127608 A1* | 6/2007 | Scheim et al. | 375/346 |
| 2008/0192857 A1* | 8/2008 | Miyoshi et al. | 375/285 |
| 2010/0273492 A1 | 10/2010 | Liu et al. | |
| 2012/0045024 A1 | 2/2012 | Cui et al. | |
| 2012/0087406 A1 | 4/2012 | Lim et al. | |
| 2012/0329403 A1* | 12/2012 | Muraoka et al. | 455/67.13 |
| 2013/0003901 A1 | 1/2013 | Kato et al. | |
| 2013/0260807 A1* | 10/2013 | Suresh | 455/501 |
| 2013/0287135 A1 | 10/2013 | Cheng et al. | |
| 2014/0126675 A1* | 5/2014 | Monsen | 375/350 |
| 2014/0334579 A1* | 11/2014 | Lincoln et al. | 375/346 |

OTHER PUBLICATIONS

D. Bai, C. Park, J. Lee, H. Nguyen, J. Singh, A. Gupta, Z. Pi, T. Kim, C. Lim, M. Kim, and I. Kang, "LTE-advanced modem design: challenges and perspectives," IEEE Commun. Mag., vol. 50, No. 2, pp. 178-186, Feb. 2007.

J. Winters, "Optimum combining in digital mobile radio with cochannel interference," IEEE J. Sel. Area. Comm., vol. 2, No. 4, pp. 528-539, 1984.

J. Lee, D. Toumpakaris, and W. Yu, "Interference mitigation via joint detection", IEEE J. Sel. Area. Comm., vol. 29, No. 6, pp. 1172-1184, 2011.

R. Ghaffar and R. Knopp, "Interference suppression strategy for cell-edge users in the downlink," IEEE T. Wirel. Commun., vol. 11, No. 1, pp. 154-165, 2012.

A. Roessler. Understanding downlink power allocation in LTE, http://www.wirelessdesignmag.com/blogs/2011/02/understanding-downlink-power-allocation-lte.

\* cited by examiner

COMPUTING SYSTEM WITH POWER ESTIMATION MECHANISM AND METHOD OF OPERATION THEREOF

CROSS-REFERENCE TO RELATED APPLICATION(S)

This application claims the benefit of U.S. Provisional Patent Application Ser. No. 61/832,732 filed Jun. 7, 2013, and the subject matter thereof is incorporated herein by reference thereto.

TECHNICAL FIELD

An embodiment of the present invention relates generally to a computing system, and more particularly to a system with power estimation mechanism.

BACKGROUND

Modern consumer and industrial electronics, especially devices such as cellular phones, navigations systems, portable digital assistants, and combination devices, are providing increasing levels of functionality to support modern life including mobile communication. Research and development in the existing technologies can take a myriad of different directions.

The increasing demand for information in modern life requires users to access information at any time, at increasing data rates. However, telecommunication signals used in mobile communication effectively experience various types of interferences from numerous sources, as well as computational complexities rising from numerous possible formats for communicated information, which affect the quality and speed of the accessible data.

Thus, a need still remains for a computing system with power estimation mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a computing system, including: an antenna configured to receive a receiver signal for representing a serving signal and an interference signal; a communication unit, coupled to the antenna, configured to: calculate a signal likelihood from the receiver signal based on a Gaussian approximation mechanism; calculate an interference power estimate based on the signal likelihood for characterizing the interference signal; and estimating the serving signal based on the interference power estimate.

An embodiment of the present invention provides a method of operation of a computing system including: receiving a receiver signal for representing a serving signal and an interference signal; calculating a signal likelihood with a communication unit from the receiver signal based on a Gaussian approximation mechanism; calculating an interference power estimate based on the signal likelihood for characterizing the interference signal; and estimating the serving signal based on the interference power estimate.

An embodiment of the present invention provides a non-transitory computer readable medium including instructions for operating a computing system including: receiving a receiver signal for representing a serving signal and an interference signal; calculating a signal likelihood with a communication unit from the receiver signal based on a Gaussian approximation mechanism; calculating an interference power estimate based on the signal likelihood for characterizing the interference signal; and estimating the serving signal based on the interference power estimate.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
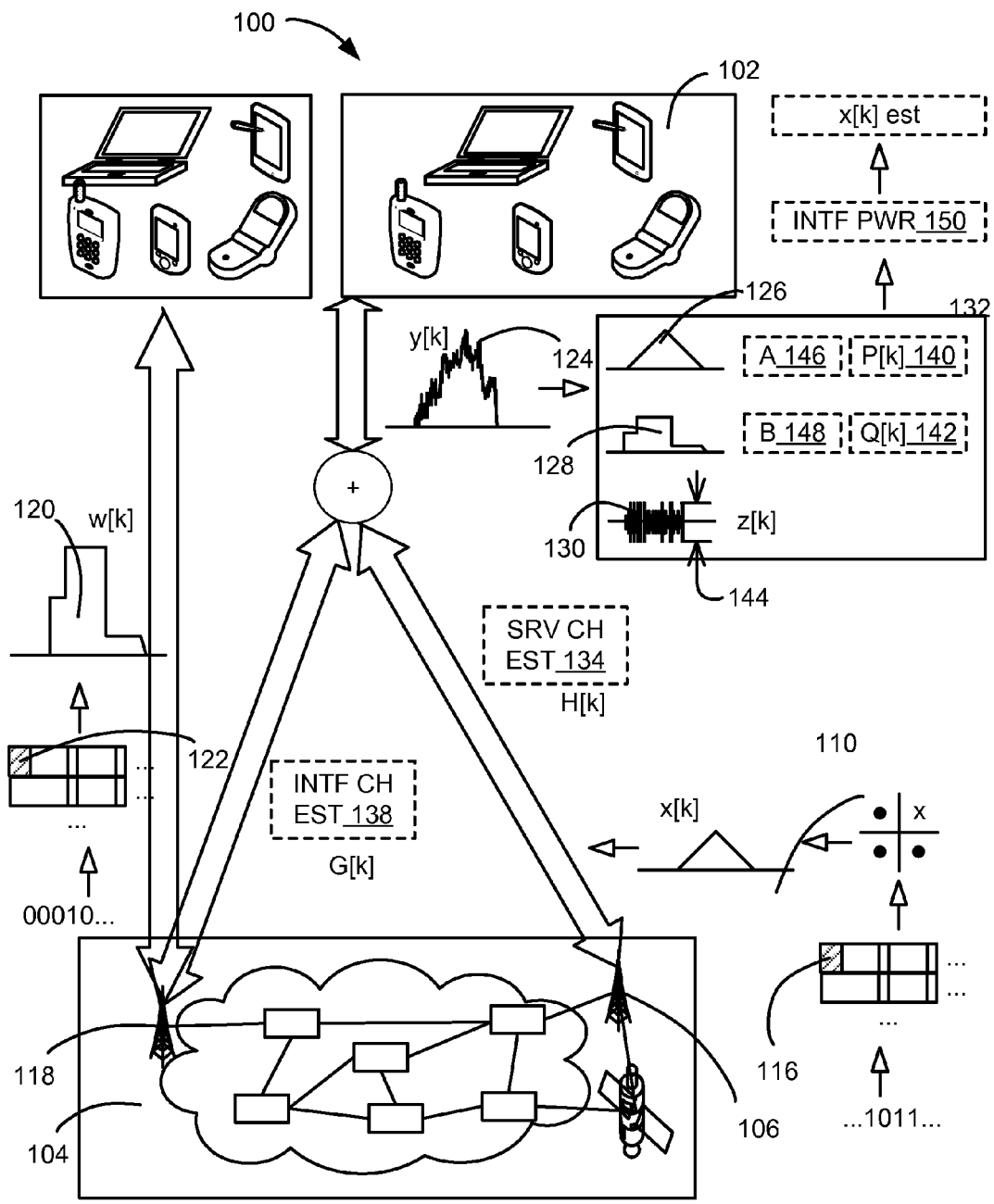
FIG. 1 is a computing system with power estimation mechanism in an embodiment of the present invention.

The following embodiments of the present invention can be used to communicate a serving signal between devices in a computing system. The serving signal can be received along with an interference signal at a device as a receiver signal. The computing system can calculate a signal likelihood and an interference power estimate based on using a Gaussian approximation mechanism to approximate the receiver signal or a portion therein.

The computing system can utilize an interference approximation mechanism, an overall approximation mechanism, or a combination thereof to calculate the signal likelihood and the interference power estimate. The computing system can calculate the signal likelihood and the interference power estimate without an interference signal detail, such as for precoding information, layer information, modulation information, or a combination thereof.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

The term "module" referred to herein can include or be implemented as software, hardware, or a combination thereof in the present invention in accordance with the context in which the term is used. For example, the software can be machine code, firmware, embedded code, and application software. The software can also include a function, a call to a function, a code block, or a combination thereof. Also for example, the hardware can be gates, circuitry, processor, computer, integrated circuit, integrated circuit cores, a pressure sensor, an inertial sensor, a microelectromechanical system (MEMS), passive devices, physical non-transitory memory medium having instructions for performing the software function, a portion therein, or a combination thereof.

The term "processing" as used herein includes manipulating signal and corresponding data, such as filtering, detecting, decoding, assembling data structures, transferring data structures, manipulating data structures, and reading and writing data structures. Data structures are defined to be information arranged as symbols, packets, blocks, files, input data, system generated data, such as calculated or generated data, and program data.

Referring now to FIG. 1, therein is shown a computing system 100 with power estimation mechanism in an embodiment of the present invention. The computing system 100 includes a first device 102, such as a mobile device including a cellular phone or a notebook computer, connected to a network 104. The network 104 is a system of wired or wireless communication devices or means that are connected to each other for enabling communication between devices.

For example, the network 104 can include a combination of wires, transmitters, receivers, antennas, towers, stations, repeaters, telephone network, servers, or client devices for a wireless cellular network. The network 104 can also include a combination of routers, cables, computers, servers, and client devices for various sized area networks.

The computing system 100 can include a second device 106 for directly or indirectly linking and communicating with the first device 102. The network 104 can include the second device 106. The second device 106 can receive wireless signals from the first device 102, transmit signals to the first device 102, process signals, or a combination thereof. The second device 106 can also relay signals between other base stations, components within the network 104, or a combination thereof.

The first device 102 can be connected to the network 104 through the second device 106. For example, the second device 106 can be a base station. Also for example, the second device 106 can be a communication device or a processing component included or with a cell tower, a wireless router, an antenna, or a combination thereof being used to communicate with, such as by sending signals to or receiving signals from, the first device 102 including a mobile computing device.

The first device 102 can connect to and communicate with other devices, such as other mobile devices, servers, computers, telephones, or a combination thereof. For example, the first device 102 can communicate with other devices by transmitting signals, receiving signals, processing signals, or a combination thereof and displaying a content of the signals, audibly recreating sounds according to the content of the signals, processing according to the content, such as storing an application or updating an operating system, or a combination thereof.

The second device 106 can be used to wirelessly exchange signals for communication, including voice signals of a telephone call or data representing a webpage and interactions therewith. The second device 106 can also transmit reference signals, training signals, error detection signals, error correction signals, header information, transmission format, protocol information, or a combination thereof.

Based on the communication method, such as code division multiple access (CDMA), orthogonal frequency-division multiple access (OFDMA), Third Generation Partnership Project (3GPP), Long Term Evolution (LTE), or fourth generation (4G) standards, the communication signals can include a reference portion, a header portion, a format portion, an error correction or detection portion, or a combination thereof imbedded in the communicated information. The reference portion, header portion, format portion, error correction or detection portion, or a combination thereof can include a predetermined bit, pulse, wave, symbol, or a combination thereof. The various portions can be embedded within the communicated signals at regular time intervals, frequency, code, or a combination thereof.

The second device 106 can communicate serving content by transmitting a serving signal 110 intended for the first device 102. The serving content can include data from a transmitting device intended for communication by reproduction or processing at a receiving device. For example, the serving content can be a sequence of bits intended for displaying, audibly recreating, executing instructions, storing, or a combination thereof at a receiving device, such as the first device 102.

The second device 106 can modify the serving content to generate and transmit the serving signal 110. The serving signal 110 is data actually transmitted by a device for communication and having a format for transmission. The serving signal 110 can be represented as '$x[k]=[x_1[k], \ldots, x_L[k]]^T$'. The serving signal 110 can be communicated using 'L' layers The second device 106 can generate the serving signal 110 by modifying, such as by interleaving, encoding, precoding, adding formatting information, or a combination thereof, the serving content according to methods or standardizations predetermined by the computing system 100 to generate a code word. The serving signal 110 can be based on point-to-point binary codes, such as turbo codes or low-density parity check codes. The second device 106 can generate the serving signal 110 using one or more symbols according to a modulation scheme, such as quadrature amplitude modulation (QAM) or phase-shift keying (PSK), corresponding to the sequence of bits.

The serving signal 110 can further include a serving reference segment 116. The serving reference segment 116 is a known or designated information transmitted by a device used to determine various types of information at a receiving device. The serving reference segment 116 can include a bit, a symbol, a signal pattern, a signal strength, frequency, phase, duration, or a combination thereof predetermined by the computing system 100, a standard, or a combination thereof. The details of the serving reference segment 116 can be known and used by one, multiple, or all devices in the computing system 100.

The serving reference segment 116 can include generic information, cell-specific information, or a combination thereof. The serving reference segment 116 can further include information regarding a transmission format. The detail, the structure, the content, or a combination thereof for the serving reference segment 116 can be used by the receiving device, such as the first device 102, to determine information regarding a mechanism used to transmit data.

The computing system 100 can further include an interference source 118 communicating an interference signal 120. The interference source 118 can include any source generating signals unintended for a specific receiver. For example, the interference source 118 can include various transmitters, including a base station or a satellite dish, another mobile communication device, such as a smart phone or a laptop computer, broadcasting station, such as for television or radio, or a combination thereof separate from the first device 102, the second device 106, or a combination thereof.

The interference signal 120 can include data unintended for communication at the receiving device. The interference signal 120 can include data or information having similar format or use as the serving content as described above, but intended for communication with a different device and received by the first device 102 or for a purpose not currently utilized by the first device 102. The interference signal 120 can be represented as '$w[k]=[w_1[k], \ldots, w_L[k]]^T$'. The interference signal 120 can be based on 'L" layers.

For illustrative purposes, the interference signal 120 is described as originating from the interference source 118. However, it is understood that the interference signal 120 can be originated from the first device 102, the second device 106, or a combination thereof communicating information unintended for exchange between the first device 102 and the second device 106.

The interference signal 120 can include an interference reference segment 122 corresponding to the interference source 118. The interference reference segment 122 a known or designated information transmitted by the interference source 118 intended to determine various types of information at a particular intended device. The interference reference segment 122 can be similar to the serving reference segment 116 but specific to the interference source 118 instead of the second device 106. The interference reference segment 122 can include information identifying or unique to the interference source 118.

The computing system 100 can include a receiver signal 124 for communicating the communication content between devices. For example, the first device 102 can receive the receiver signal 124 as data or information identified or determined by the first device 102 for communication. The first device 102 can receive the receiver signal 124 including information or data from various sources. For example, the receiver signal 124 can include a receiver serving portion 126, a receiver interference portion 128, a noise portion 130, or a combination thereof.

The receiver serving portion 126 is a part of the receiver signal 124 corresponding to the serving content. For example, the receiver serving portion 126 can correspond to data or information transmitted by the second device 106, such as the serving signal 110. The receiver serving portion 126 can be based on the serving reference segment 116 unique to a corresponding device for the communication.

The receiver serving portion 126 can be a result of the serving signal 110 traversing a serving channel. The serving channel can be a direct link between corresponding devices, such as between the first device 102 and the second device 106. The serving channel can also include repeaters, amplifiers, or a combination thereof there-between for an indirect link. The serving channel can include a specific instance or value of communication frequency, time slot, packet designation, transmission rate, channel code, or a combination thereof used for transmitting signals between intended devices.

The serving channel can further include physical characteristics unique to geographic locations associated with the intended devices. The serving channel can include structures or influences, such as fading characteristics of signals or causes for unique delay or reflection of signals, affecting the transmission of wireless signals. The serving channel can distort or alter the signals traversing therein.

The computing system 100 can calculate a serving channel estimate 134 to characterize the serving channel or the effects of traversing the serving channel. For example, the serving channel estimate 134 can represent fading, distortions or alterations from delayed signals or echoes, or a combination thereof of the serving channel. The computing system 100 can calculate the serving channel estimate 134 using the serving reference segment 116 represented in the receiver serving portion 126.

The serving channel estimate 134 can be represented as '$H[k]=[h_{ij}[k]]_{N_r \times N_t}$'. The term '$N_t$' can represent number of transmit antennas corresponding to the second device 106 for the serving signal 110.

The receiver interference portion 128 is a part of the receiver signal 124 corresponding to the information unintended for the receiver device. The receiver interference portion 128 can degrade or alter the receiver serving portion 126, becoming a hindrance in communicating the serving content between intended devices.

For example, the receiver interference portion 128 can correspond to data or information transmitted by the interference source 118, such as the interference signal 120. Also for example, the receiver interference portion 128 can correspond to data or information transmitted by the second device 106 using a frequency or an identifier unintended for communicating with the first device 102.

Similarly, the receiver interference portion 128 can be a result of the interference signal 120 traversing an interference channel. The interference channel can be a direct or an indirect link between unintended communication counterparts, such as between the first device 102 and the interference source 118 or between the first device 102 and the second device 106 for unintended data.

The interference channel can be similar to the serving channel, but specific to communicating unintended information. For example, the interference channel can include a specific instance or value of communication frequency, time slot, packet designation, transmission rate, channel code, or a combination thereof used for transmitting signals between unintended devices. Also for example, the interference channel can include physical characteristics unique to geographic locations associated with the intended devices. The interference channel can distort or alter the signals traversing therein.

The computing system 100 can calculate an interference channel estimate 138 to characterize the interference channel or the effects of traversing the interference channel. For example, the interference channel estimate 138 can represent fading, distortions or alterations from delayed signals or echoes, or a combination thereof specific to the interference channel. The computing system 100 can calculate the interference channel estimate 138 using the interference reference segment 122 represented in the receiver interference portion 128.

The interference channel estimate 138 can be represented as $$`G[k] = [g_{ij}[k]]_{N_r \times N_t'}`.$$

The term '$N_t'$' can represent number of transmit antennas corresponding to the interference source 118 for the interference signal 120.

The computing system 100 can further use a serving precode 140 for the serving signal 110 and an interference precode 142 for the interference signal 120. The serving precode 140 and the interference precode 142 can be a modification of the signal for beam-forming in communication. The serving precode 140 and the interference precode 142 can be used in communication utilizing multiple antennas, such as for multiple-input multiple-output (MIMO) communication.

The serving precode 140 and the interference precode 142 can each be implemented as matrices of factors applied to the content data or a derivation thereof to produce the serving signal 110 and the interference signal 120. The serving precode 140 can be represented as '$P[k]=[p_{ij}[k]]_{N \times L}$' and the interference precode 142 can be represented as $$`Q[k] = [q_{ij}[k]]_{N_t' \times L'}`.$$

The serving precode 140 can correspond to the receiver serving portion 126 and the interference precode 142 can correspond to the receiver interference portion 128.

The noise portion 130 can include error or deviations in the data. The noise portion 130 can be from a processing channel or a route for the data, hardware components processing signals, background noise, or a combination thereof. The noise portion 130 can also include changes in the signal or the data due to hardware component limitations, such as tolerance levels or cross-talk between components. The noise portion 130 can be independent of the transmit symbols.

The noise portion 130 can be additive in nature and have a random Gaussian or Rayleigh distribution for the changes. Moreover, the noise portion 130 can be independent and identically distributed (i.i.d.) sequence of uncorrelated circularly symmetric complex Gaussian random vector with zero mean. The noise portion 130 can be represented as '$z[k]=[z_1[k], \ldots, z_{N_r}[k]]^T$'.

The noise portion 130 can be characterized by a noise variance 144. The noise variance 144 is a statistical characteristic of the noise portion 130. The noise variance 144 can be a covariance of the noise portion 130. The noise variance 144 can be a measure of spread, distancing, density, power, or a combination thereof for the noise portion 130.

The noise variance 144 can be known to the computing system 100. For example, the computing system 100 can estimate the noise variance 144, represented as '$\sigma^2$' or '$\sigma^2 I_{N_r}$' with '$I_{N_r}$' further representing an identity matrix of size '$N_r$'. Also for example, the computing system 100 can include the noise variance 144 predetermined by the computing system 100, such as in a look-up table, determined using a dedicated device or circuitry, or a combination thereof.

The receiver signal 124 can be further affected by a serving amplitude offset 146, an interference amplitude offset 148, or a combination thereof. The serving amplitude offset 146 can be a shift in magnitude of energy levels for the receiver serving portion 126 corresponding to the serving signal 110. The interference amplitude offset 148 can be a shift in magnitude of energy levels for the receiver interference portion 128 corresponding to the interference signal 120. The amplitude offsets can be due to the transmitting device, the receiving device, the channel, or a combination thereof.

The serving amplitude offset 146 and the interference amplitude offset 148 can be semi-static parameters. The computing system 100 can estimate the offsets using a finite number of observations for the receiver signal 124. The serving amplitude offset 146 can be represented as 'A' and the interference amplitude offset 148 can be represented as 'B'.

The receiver serving portion 126 can be a combination of the serving amplitude offset 146, the serving channel estimate 134, the serving precode 140, and the serving signal 110. The receiver interference portion 128 can be a combination of the interference amplitude offset 148, the interference channel estimate 138, the interference precode 142, and the interference signal 120. The receiver signal 124 can be a combination of the receiver serving portion 126 and the receiver interference portion 128. The receiver signal 124 can be represented as:

$$y[k]=AH[k]P[k]x[k]+BG[k]Q[k]w[k]+z[k]. \quad \text{Equation (1)}.$$

The computing system 100 can calculate an interference power estimate 150 from the receiver signal 124. The interference power estimate 150 is a representation of an amount of energy within the interference signal 120. The computing system 100 can calculate the interference power estimate 150 despite the interference signal 120 changing or degrading through the signal traversal, device particularities, influences from other signals, or a combination thereof.

Moreover, the computing system 100 can calculate the interference power estimate 150 using a blind application mechanism where the computing system 100 is unaware of various details regarding the interference signal 120. For example, the computing system 100 can calculate the interference power estimate 150 without knowing or utilizing a number of layers for the interference signal 120, the interference precode 142, the modulation scheme for the interference signal 120, or a combination thereof.

The computing system 100 can use the interference power estimate 150 to further process the receiver signal 124 and recover the serving content. For example, the computing system 100 can use the interference power estimate 150 to mitigate or eliminate the receiver interference portion 128 in the receiver signal 124 through an interference whitening process. Also for example, the computing system 100 can use the interference power estimate 150 to jointly detect, decode, or a combination thereof for the serving signal 110 and the interference signal 120. Details regarding the calculation and the use of the interference power estimate 150 will be described below.

For illustrative purposes, the computing system 100 is described as the second device 106 transmitting information and the first device 102 receiving the transmitted information. However, it is understood that the computing system 100 can have the second device 106 as the receiving device and the first device 102 as the transmitting device.

Also for illustrative purposes, the computing system 100 is described as having one instance of the interference signal 120 and one instance of the interference source 118 relative to communicating between the first device 102 and the second device 106. However, it is understood that the computing system 100 can experience and process for multiple interference signals and sources.

Figure 2:
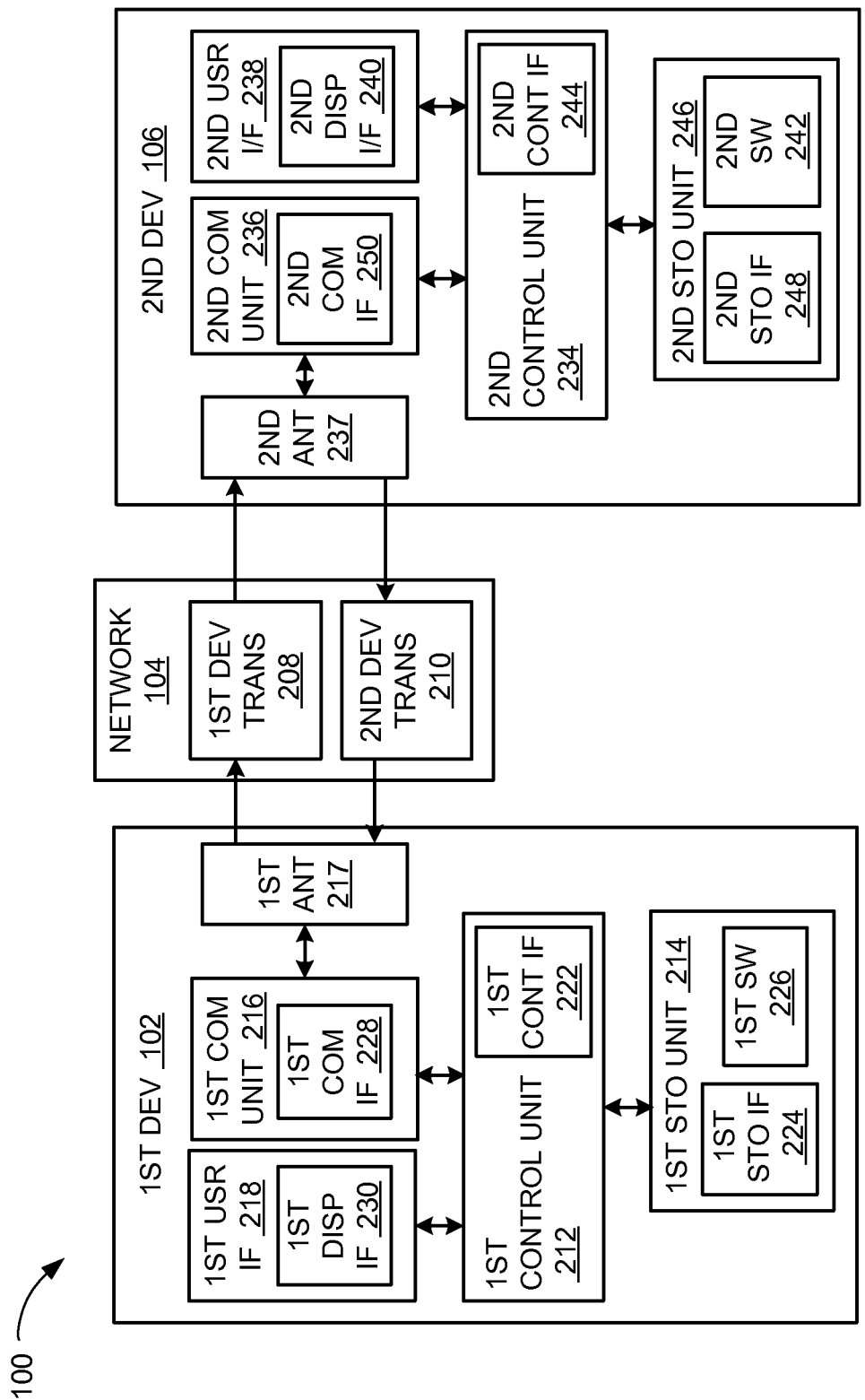
FIG. 2 is an exemplary block diagram of the computing system.

Referring now to FIG. 2, therein is shown an exemplary block diagram of the computing system 100. The computing system 100 can include the first device 102, the network 104, and the second device 106. The first device 102 can send information in a first device transmission 208 over the network 104 to the second device 106. The second device 106 can send information in a second device transmission 210 over the network 104 to the first device 102.

For illustrative purposes, the computing system 100 is shown with the first device 102 as a client device, although it is understood that the computing system 100 can have the first device 102 as a different type of device. For example, the first device 102 can be a server having a display interface.

Also for illustrative purposes, the computing system 100 is shown with the second device 106 as a server, although it is understood that the computing system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 212, a first storage unit 214, a first communication unit 216, and a first user interface 218. The first control unit 212 can include a first control interface 222. The first control unit 212 can execute a first software 226 to provide the intelligence of the computing system 100.

The first control unit 212 can be implemented in a number of different manners. For example, the first control unit 212 can be a processor, an application specific integrated circuit (ASIC) an embedded processor, a microprocessor, a hardware control logic, a hardware finite state machine (FSM), a digital signal processor (DSP), or a combination thereof. The first control interface 222 can be used for communication between the first control unit 212 and other functional units in the first device 102. The first control interface 222 can also be used for communication that is external to the first device 102.

The first control interface 222 can receive information from the other functional units or from external sources, or can transmit information to the other functional units or to external destinations. The external sources and the external destinations refer to sources and destinations external to the first device 102.

The first control interface 222 can be implemented in different ways and can include different implementations depending on which functional units or external units are being interfaced with the first control interface 222. For example, the first control interface 222 can be implemented with a pressure sensor, an inertial sensor, a microelectromechanical system (MEMS), optical circuitry, waveguides, wireless circuitry, wireline circuitry, or a combination thereof.

The first storage unit 214 can store the first software 226. The first storage unit 214 can also store the relevant information, such as data representing incoming images, data representing previously presented image, sound files, or a combination thereof.

The first storage unit 214 can be a volatile memory, a nonvolatile memory, an internal memory, an external memory, or a combination thereof. For example, the first storage unit 214 can be a nonvolatile storage such as non-volatile random access memory (NVRAM), Flash memory, disk storage, or a volatile storage such as static random access memory (SRAM).

The first storage unit 214 can include a first storage interface 224. The first storage interface 224 can be used for communication between the first storage unit 214 and other functional units in the first device 102. The first storage interface 224 can also be used for communication that is external to the first device 102.

The first storage interface 224 can receive information from the other functional units or from external sources, or can transmit information to the other functional units or to external destinations. The external sources and the external destinations refer to sources and destinations external to the first device 102.

The first storage interface 224 can include different implementations depending on which functional units or external units are being interfaced with the first storage unit 214. The first storage interface 224 can be implemented with technologies and techniques similar to the implementation of the first control interface 222.

The first communication unit 216 can enable external communication to and from the first device 102. For example, the first communication unit 216 can permit the first device 102 to communicate with the second device 106, a different device, an attachment, such as a peripheral device or a desktop computer, the network 104, or a combination thereof.

The first communication unit 216 can also function as a communication hub allowing the first device 102 to function as part of the network 104 and not limited to be an end point or terminal unit to the network 104. The first communication unit 216 can include active and passive components, such as microelectronics or an antenna, for interaction with the network 104.

The first communication unit 216 can include a baseband device or component, a modem, a digital signal processor, or a combination thereof for transmitting, formatting, receiving, detecting, decoding, further processing, or a combination thereof for communication signals. The first communication unit 216 can include one or more portions for processing the voltages, the currents, the digital information, or a combination thereof, such as an analog-to-digital converter, a digital-to-analog converter, a filter, an amplifier, a processor-type circuitry, or a combination thereof. The first communication unit 216 can further include one or more portions for storing information, such as cache or RAM memory, registers, or a combination thereof.

The first communication unit 216 can be coupled with a first antenna 217. The first antenna 217 can be a device or a portion of a device for physically communicating signals. The first antenna 217 can communicate by transmitting or receiving signals to or from another device. The first antenna 217 can be for wireless signals. The first antenna 217 can include an omnidirectional antenna, a wire, an antenna chip, a ceramic antenna, or a combination thereof.

The first antenna 217 can detect or respond to a power in electromagnetic waves and provide the detected result to the first communication unit 216 to receive a signal, including the second device transmission 210. The first antenna 217 can provide a path or respond to currents or voltages provided by the first communication unit 216 to transmit a signal, including the first device transmission 208.

The first communication unit 216 can include a first communication interface 228. The first communication interface 228 can be used for communication between the first communication unit 216 and other functional units in the first device 102. The first communication interface 228 can receive information from the other functional units or can transmit information to the other functional units.

The first communication interface 228 can include different implementations depending on which functional units are being interfaced with the first communication unit 216. The first communication interface 228 can be implemented with technologies and techniques similar to the implementation of the first control interface 222.

The first user interface 218 allows a user (not shown) to interface and interact with the first device 102. The first user interface 218 can include an input device and an output device. Examples of the input device of the first user interface 218 can include a keypad, a touchpad, soft-keys, a keyboard, a microphone, an infrared sensor for receiving remote signals, or any combination thereof to provide data and communication inputs.

The first user interface 218 can include a first display interface 230. The first display interface 230 can include an output device. The first display interface 230 can include a display, a projector, a video screen, a speaker, or any combination thereof.

The first control unit 212 can operate the first user interface 218 to display information generated by the computing system 100. The first control unit 212 can also execute the first software 226 for the other functions of the computing system 100. The first control unit 212 can further execute the first software 226 for interaction with the network 104 via the first communication unit 216.

The second device 106 can be optimized for implementing an embodiment of the present invention in a multiple device embodiment with the first device 102. The second device 106 can provide the additional or higher performance processing power compared to the first device 102. The second device 106 can include a second control unit 234, a second communication unit 236, a second user interface 238, and a second storage unit 246.

The second user interface 238 allows a user (not shown) to interface and interact with the second device 106. The second user interface 238 can include an input device and an output device. Examples of the input device of the second user interface 238 can include a keypad, a touchpad, soft-keys, a keyboard, a microphone, or any combination thereof to provide data and communication inputs. Examples of the output device of the second user interface 238 can include a second display interface 240. The second display interface 240 can include a display, a projector, a video screen, a speaker, or any combination thereof.

The second control unit 234 can execute a second software 242 to provide the intelligence of the second device 106 of the computing system 100. The second software 242 can operate in conjunction with the first software 226. The second control unit 234 can provide additional performance compared to the first control unit 212.

The second control unit 234 can operate the second user interface 238 to display information. The second control unit 234 can also execute the second software 242 for the other functions of the computing system 100, including operating the second communication unit 236 to communicate with the first device 102 over the network 104.

The second control unit 234 can be implemented in a number of different manners. For example, the second control unit 234 can be a processor, an embedded processor, a microprocessor, hardware control logic, a hardware finite state machine (FSM), a digital signal processor (DSP), or a combination thereof.

The second control unit 234 can include a second control interface 244. The second control interface 244 can be used for communication between the second control unit 234 and other functional units in the second device 106. The second control interface 244 can also be used for communication that is external to the second device 106.

The second control interface 244 can receive information from the other functional units or from external sources, or can transmit information to the other functional units or to external destinations. The external sources and the external destinations refer to sources and destinations external to the second device 106.

The second control interface 244 can be implemented in different ways and can include different implementations depending on which functional units or external units are being interfaced with the second control interface 244. For example, the second control interface 244 can be implemented with a pressure sensor, an inertial sensor, a microelectromechanical system (MEMS), optical circuitry, waveguides, wireless circuitry, wireline circuitry, or a combination thereof.

A second storage unit 246 can store the second software 242. The second storage unit 246 can also store the information such as data representing incoming images, data representing previously presented image, sound files, or a combination thereof. The second storage unit 246 can be sized to provide the additional storage capacity to supplement the first storage unit 214.

For illustrative purposes, the second storage unit 246 is shown as a single element, although it is understood that the second storage unit 246 can be a distribution of storage elements. Also for illustrative purposes, the computing system 100 is shown with the second storage unit 246 as a single hierarchy storage system, although it is understood that the computing system 100 can have the second storage unit 246 in a different configuration. For example, the second storage unit 246 can be formed with different storage technologies forming a memory hierarchal system including different levels of caching, main memory, rotating media, or off-line storage.

The second storage unit 246 can be a volatile memory, a nonvolatile memory, an internal memory, an external memory, or a combination thereof. For example, the second storage unit 246 can be a nonvolatile storage such as nonvolatile random access memory (NVRAM), Flash memory, disk storage, or a volatile storage such as static random access memory (SRAM).

The second storage unit 246 can include a second storage interface 248. The second storage interface 248 can be used for communication between the second storage unit 246 and other functional units in the second device 106. The second storage interface 248 can also be used for communication that is external to the second device 106.

The second storage interface 248 can receive information from the other functional units or from external sources, or can transmit information to the other functional units or to external destinations. The external sources and the external destinations refer to sources and destinations external to the second device 106.

The second storage interface 248 can include different implementations depending on which functional units or external units are being interfaced with the second storage unit 246. The second storage interface 248 can be implemented with technologies and techniques similar to the implementation of the second control interface 244.

The second communication unit 236 can enable external communication to and from the second device 106. For example, the second communication unit 236 can permit the second device 106 to communicate with the first device 102 over the network 104.

The second communication unit 236 can also function as a communication hub allowing the second device 106 to function as part of the network 104 and not limited to be an end point or terminal unit to the network 104. The second communication unit 236 can include active and passive components, such as microelectronics or resistors, for interaction with the network 104.

The second communication unit 236 can include a baseband device or component, a modem, a digital signal processor, or a combination thereof for transmitting, formatting, receiving, detecting, decoding, further processing, or a combination thereof for communication signals. The second communication unit 236 can include one or more portions for processing the voltages, the currents, the digital information, or a combination thereof, such as an analog-to-digital converter, a digital-to-analog converter, a filter, an amplifier, a processor-type circuitry, or a combination thereof. The second communication unit 236 can further include one or more portions for storing information, such as cache or RAM memory, registers, or a combination thereof.

The second communication unit 236 can be coupled with a second antenna 237. The second antenna 237 can be a device or a portion of a device for physically communicating signals. The second antenna 237 can communicate by transmitting or receiving signals to or from another device. The second antenna 237 can be for wireless signals. The second antenna 237 can include an omnidirectional antenna, a wire, an antenna chip, a ceramic antenna, or a combination thereof.

The second antenna 237 can detect or respond to a power in electromagnetic waves and provide the detected result to the second communication unit 236 to receive a signal, including the first device transmission 208. The second antenna 237 can provide a path or respond to currents or voltages provided by the second communication unit 236 to transmit a signal, including the second device transmission 210.

The second communication unit 236 can include a second communication interface 250. The second communication interface 250 can be used for communication between the second communication unit 236 and other functional units in the second device 106. The second communication interface 250 can receive information from the other functional units or can transmit information to the other functional units.

The second communication interface 250 can include different implementations depending on which functional units are being interfaced with the second communication unit 236. The second communication interface 250 can be implemented with technologies and techniques similar to the implementation of the second control interface 244.

The first communication unit 216 can couple with the network 104 to send information to the second device 106 in the first device transmission 208. The second device 106 can receive information in the second communication unit 236 from the first device transmission 208 of the network 104.

The second communication unit 236 can couple with the network 104 to send information to the first device 102 in the second device transmission 210. The first device 102 can receive information in the first communication unit 216 from the second device transmission 210 of the network 104. The computing system 100 can be executed by the first control unit 212, the second control unit 234, or a combination thereof. For illustrative purposes, the second device 106 is shown with the partition having the second user interface 238, the second storage unit 246, the second control unit 234, and the second communication unit 236, although it is understood that the second device 106 can have a different partition. For example, the second software 242 can be partitioned differently such that some or all of its function can be in the second control unit 234 and the second communication unit 236. Also, the second device 106 can include other functional units not shown in FIG. 2 for clarity.

The functional units in the first device 102 can work individually and independently of the other functional units. The first device 102 can work individually and independently from the second device 106 and the network 104.

The functional units in the second device 106 can work individually and independently of the other functional units. The second device 106 can work individually and independently from the first device 102 and the network 104.

The functional units described above can be implemented in hardware. For example, one or more of the functional units can be implemented using the a gate, circuitry, a processor, a computer, integrated circuit, integrated circuit cores, a pressure sensor, an inertial sensor, a microelectromechanical system (MEMS), a passive device, a physical non-transitory memory medium having instructions for performing the software function, a portion therein, or a combination thereof.

For illustrative purposes, the computing system 100 is described by operation of the first device 102 and the second device 106. It is understood that the first device 102 and the second device 106 can operate any of the modules and functions of the computing system 100.

Figure 3:
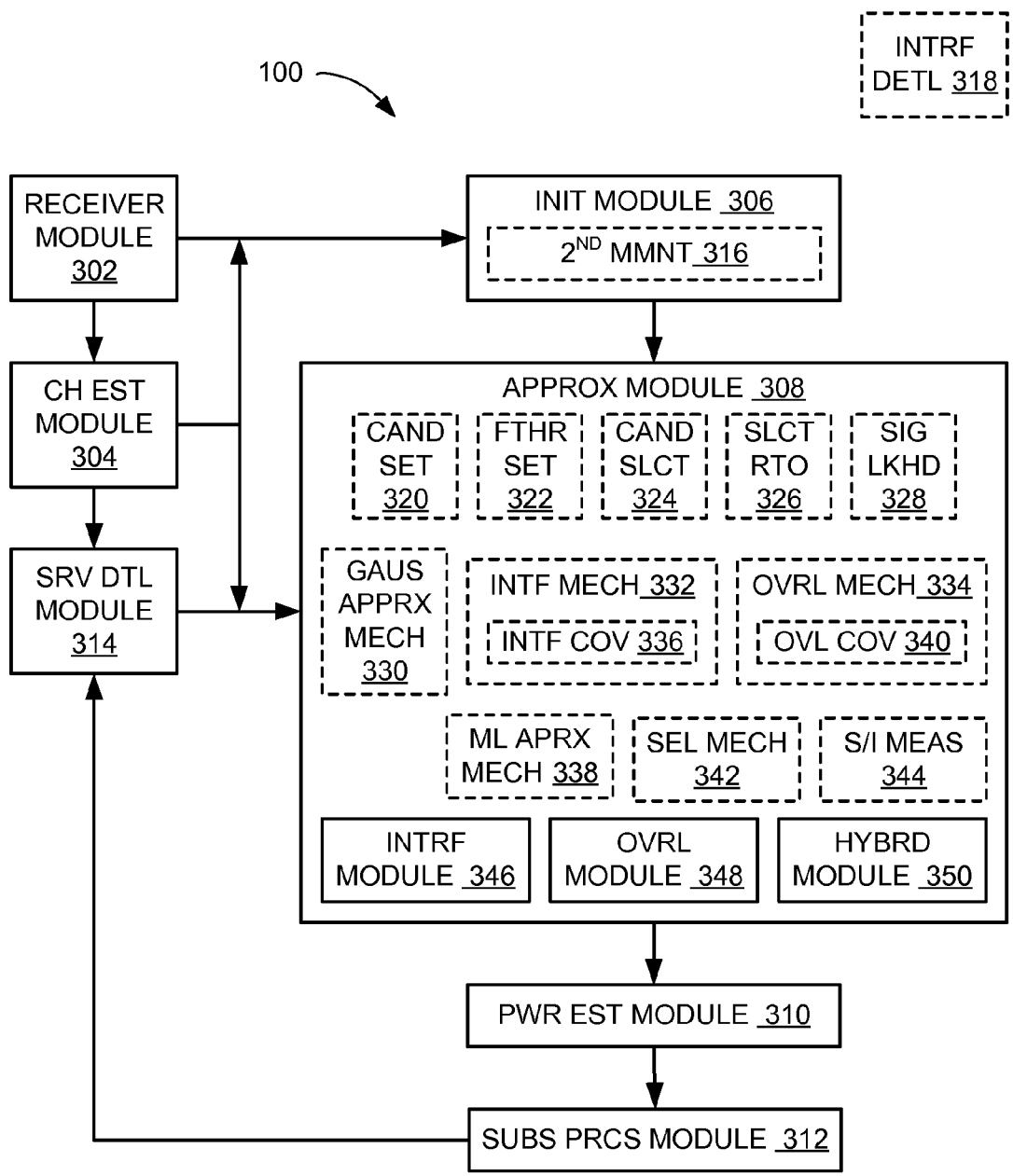
FIG. 3 is a control flow of the computing system.

Referring now to FIG. 3, therein is shown a control flow of the computing system 100. The computing system 100 can include a receiver module 302, a channel estimate module 304, an initialization module 306, an approximation module 308, a power estimate module 310, a subsequent process module 312, a serving detail module 314, or a combination thereof.

The receiver module 302 can be coupled to the channel estimate module 304, the initialization module 306, or a combination thereof. The initialization module 306, the channel estimate module 304, or a combination thereof can be coupled to the approximation module 308. The approximation module 308 can be coupled to the serving detail module 314, the power estimate module 310, or a combination thereof. The subsequent process module 312 can be coupled to the power estimate module 310, the serving detail module 314, or a combination thereof.

The modules can be coupled to each other in a variety of ways. For example, modules can be coupled by having the input of one module connected to the output of another, such as by using wired or wireless connections, the network 104 of FIG. 1, instructional steps, process sequence, or a combination thereof. Also for example, the modules can be coupled either directly with no intervening structure other than connection means between the directly coupled modules, or indirectly with modules or devices other than the connection means between the indirectly coupled modules.

As a more specific example, one or more outputs of the receiver module 302 can be connected to one or more inputs of the channel estimate module 304, the initialization module 306, or a combination thereof using conductors or the transmission channel without intervening modules or devices there-between. Also for example, the channel estimate module 304 can be coupled to the serving detail module 314, the initialization module 306, the approximation module 308, or a combination thereof directly, similar to the receiver module 302 and the channel estimate module 304, or indirectly using a wireless channel with a repeater, a switch, a routing device, or a combination thereof. The above described modules can be coupled in similar ways.

The computing system 100 can communicate with or using a device, such as by displaying images, recreating sounds, exchanging process steps or instructions, or a combination thereof. The computing system 100 can communicate information between devices. The receiving device can further communicate with the user by displaying images, recreating sounds, exchanging process steps or instructions, or a combination thereof according to the information communicate to the device.

The receiver module 302 is configured to receive the receiver signal 124 of FIG. 1. The receiver module 302 can receive the receiver signal 124 corresponding to and representing the serving signal 110 of FIG. 1, the interference signal 120 of FIG. 1, or a combination thereof. The receiver module 302 can receive the receiver signal 124 as the serving signal 110, the interference signal 120, or a combination thereof having respectively traversed the serving channel, the interference channel, or a combination thereof.

The receiver module 302 can receive the receiver signal 124 by recording electrical power, voltage, current, or a combination thereof. For example, the receiver module 302 can receive the receiver signal 124 by recording energy levels or changes therein for the first antenna 217 of FIG. 2, the second antenna 237 of FIG. 2, the first communication interface 228 of FIG. 2, the second communication interface 250 of FIG. 2, the first control interface 222 of FIG. 2, the second control interface 244 of FIG. 2, or a combination thereof.

Also for example, the receiver module 302 can receive the receiver signal 124 by recording energy levels or changes received through a wireless antenna, a wire or a conductor, an instruction or a step for transferring data between devices, processes, instructions, between portions therein, or a combination thereof. Also for example, the receiver module 302 can record the receiver signal 124 by storing the energy levels or changes therein, according to a time, a sequence, or a combination thereof in the first communication unit 216 of FIG. 2, the second communication unit 236 of FIG. 2, the first storage unit 214 of FIG. 2, the second storage unit 246 of FIG. 2, or a combination thereof.

The receiver module 302 can process the receiver signal 124 to determine aspects thereof. For example, the receiver module 302 can determine a sample size, a sample index, the serving reference segment 116 of FIG. 1, the interference reference segment 122 of FIG. 1, the noise portion 130 of FIG. 1, or a combination thereof. The receiver module 302 can recognize based on a method or a process predetermined by the computing system 100 or a standard for controlling a sampling rate, a block size, a symbol size, or a combination thereof.

The receiver module 302 can further use a dedicated device, circuitry, process, or a combination thereof to determine the aspects of the receiver signal 124 including the noise portion 130. The receiver module 302 can also use known parts or aspects of the receiver signal to further identify appropriate instance of the values for other aspects as predetermined and stored by the computing system 100. The receiver module 302 can further determine the noise variance 144 of FIG. 1 using a statistical analysis based on the noise portion 130, based on values predetermined by the computing system 100, or a combination thereof.

The receiver module 302 can determine the aspects of the receiver signal 124 using the first communication unit 216, the second communication unit 236, the first control unit 212 of FIG. 2, the second control unit 234 of FIG. 2, or a combination thereof. The receiver module 302 can store the aspects of the receiver signal 124 in the first communication unit 216, the second communication unit 236, the first storage unit 214, the second storage unit 246, or a combination thereof.

After receiving the receiver signal 124 and determining the aspects thereof, the control flow can pass to the channel estimate module 304. The control flow can pass through a variety of ways. For example, control flow can pass by having processing results of one module passed to another module, such as by passing the receiver signal 124, the determined aspects thereof, or a combination thereof from the receiver module 302 to the channel estimate module 304, by storing the processing results at a location known and accessible to the other module, such as by storing the receiver signal 124, the determined aspects thereof, or a combination thereof at a storage location known and accessible to the channel estimate module 304, by notifying the other module, such as by such as by using a flag, an interrupt, a status signal, or a combination for the channel estimate module 304, or a combination of processes thereof.

The channel estimate module 304 is configured to characterize communication channels. For example, the channel estimate module 304 can determine the serving channel estimate 134 of FIG. 1, the interference channel estimate 138 of FIG. 1, or a combination thereof.

The channel estimate module 304 can use the serving reference segment 116, the interference reference segment 122, a portion in the receiver signal 124 corresponding thereto, or a combination thereof to determine the serving channel estimate 134, the interference channel estimate 138, or a combination thereof. The details, formats, requirements, or a combination thereof regarding the serving reference segment 116, the interference reference segment 122, or a combination thereof, such as regarding original frequency, phase, content, shape, or a combination thereof, can be predetermined by the communication standard, the computing system 100, or a combination thereof.

The channel estimate module 304 can compare the received instances of the receiver signal 124 or segments therein to the predetermined parameters for the serving reference segment 116, the interference reference segment 122, or a combination thereof. The channel estimate module 304 can further use frequency domain transformation or time domain transformation, convolution, transposition, basic mathematical operations, or a combination thereof with the predetermined or received instances of the reference communication, or both.

The channel estimate module 304 can further calculate the changes in magnitude, frequency, phase, or a combination thereof in the reference portion in the serving signal 110, the interference signal 120, or a combination thereof to the receiver signal 124. The channel estimate module 304 can further use various methods, such as the least square method, the least mean square (LMS) method, or the minimum mean square error (MMSE) method, to determine the serving channel estimate 134, the interference channel estimate 138, or a combination thereof.

The channel estimate module 304 can use the first communication unit 216, the second communication unit 237, the first control unit 212, the second control unit 234, or a combination thereof to determine the serving channel estimate 134, the interference channel estimate 138, or a combination thereof. The channel estimate module 304 can store the serving channel estimate 134, the interference channel estimate 138, or a combination thereof in the first communication unit 216, the second communication unit 236, the first storage unit 214, the second storage unit 246, or a combination thereof.

After characterizing the channels, the control flow can be passed to the initialization module 306. The control flow can pass similarly as described above between the receiver module 302 and the channel estimate module 304, but using the processing results of the channel estimate module 304, such as the serving channel estimate 134, the interference channel estimate 138, or a combination thereof. The serving channel estimate 134, the interference channel estimate 138, or a combination thereof can further be accessible to the approximation module 308.

The initialization module 306 is configured to calculate an initial value or an initial instance of the interference power estimate 150 of FIG. 1. The initialization module 306 can calculate a second moment estimate 316 as the initial value or instance of the interference power estimate 150. The initialization module 306 can calculate the second moment estimate 316 based on a heuristic power estimation using the second moment of the receiver signal 124, including calculating the second moment estimate 316 as an average power of the receiver signal 124.

The initialization module 306 can calculate the second moment estimate 316 based a relationship represented as:

$$\frac{1}{K}\sum_{k=1}^{K}\|y[k]\|^2 \approx E[\|y[k]\|^2] =$$
$$A^2 \frac{1}{K}\sum_{k=1}^{K}\|H[k]P[k]\|_F^2 + B^2 \frac{1}{K}\sum_{k=1}^{K}\|G[k]Q[k]\|_F^2 + N_r\sigma^2.$$

Equation (2).

The term 'k' can represent the index for a sample within the receiver signal 124, and the term 'K' can represent a total number of samples or indices for the receiver signal 124 or a grouping therein.

As described above, the receiver signal 124 can be represented as 'y[k]', the serving amplitude offset 146 of FIG. 1 can be represented as 'A', the serving channel estimate 134 can be represented as 'H[k]', and the serving precode 140 of FIG. 1 can be represented as 'P[k]'. Moreover, the interference amplitude offset 148 of FIG. 1 can be represented as 'B', the interference channel estimate 138 can be represented as 'G[k]', and the interference precode 142 of FIG. 1 can be represented as 'Q[k]'. The noise portion 130 or the noise variance 144 can be represented as '$N_r\sigma^2$'.

The initialization module 306 can calculate the second moment estimate 316 based on:

$$\hat{B}_{2nd\ moment} = \sqrt{\frac{\sum_{k=1}^{K}\|y[k]\|^2 - A^2\frac{1}{N_t}\sum_{k=1}^{K}\|H[k]\|_F^2 - KN_r\sigma^2}{\frac{1}{N_t'}\sum_{k=1}^{K}\|G[k]\|_F^2}}.$$

Equation (3).

The second moment estimate 316 can be represented as '$\hat{B}_{2nd\ moment}$'.

The initialization module 306 can calculate the second moment estimate 316 without an interference signal detail 318. The interference signal detail 318 is information regarding the interference signal 120 derived from processing a content therein other than the interference reference segment 122. The interference signal detail 318 can include information accessible by intended recipient of the interference signal 120 and not accessible to the unintended device receiving as interference, such as the first device 102 of FIG. 1 or the second device 106 of FIG. 1.

For example, the interference signal detail 318 can include the interference precode 142, information regarding number of layers for the interference signal 120, modulation scheme of the interference signal 120, coding mechanism for the interference signal 120, or a combination thereof. Also for example, the interference signal detail 318 can exclude information accessible by the unintended device, such as the interference reference segment 122, the interference amplitude offset 148, the interference channel estimate 138, or a combination thereof. As a more specific example, the initialization module 306 can calculate the second moment estimate 316 using Equation (3) including only the interference channel estimate 138 and excluding any of the interference signal detail 318.

The computing system 100 can calculate the interference power estimate 150 based on the second moment estimate 316. The computing system 100 can use the second moment estimate 316 for initializing the interference power estimate 150. The computing system 100 can further calculate the interference power estimate 150 without the interference signal detail 318. Details regarding the calculation of the interference power estimate 150 will be described below.

The initialization module 306 can use the first communication unit 216, the second communication unit 237, the first control unit 212, the second control unit 234, or a combination thereof to calculate the second moment estimate 316. The initialization module 306 can store the second moment estimate 316 in the first communication unit 216, the second communication unit 236, the first storage unit 214, the second storage unit 246, or a combination thereof.

After calculating the second moment estimate 316, the control flow can be passed to the approximation module 308. The control flow can pass similarly as described above between the receiver module 302 and the channel estimate module 304, but using the processing results of the initialization module 306, such as the second moment estimate 316.

The approximation module 308 is configured to process the receiver signal 124 for determining the receiver serving portion 126 of FIG. 1. The approximation module 308 can determine the receiver serving portion 126 for recovering the serving signal 110. The approximation module 308 can process for the receiver interference portion 128 of FIG. 1 for removal in processing for the serving signal 110.

The approximation module 308 can process potential values for the serving amplitude offset 146, the interference amplitude offset 148, or a combination thereof. The serving amplitude offset 146, the interference amplitude offset 148, or a combination thereof can be candidate power offsets based on power ratios of downlink data and reference signals for serving or interfering signals. For example, the approximation module 308 can include a candidate set 320, a further set 322, or a combination thereof for MIMO communication.

The candidate set 320 and the further set 322 can include potential values associated with the serving amplitude offset 146, the interference amplitude offset 148, or a combination thereof. The candidate set 320 and the further set 322 represent ratios of physical downlink shared channel (PDSCH) to reference portion energy per resource element (EPRE), such as for the serving reference segment 116, the interference reference segment 122, or a combination thereof.

The candidate set 320 and the further set 322 can be distinguished based on correspondence to symbols containing no reference signals and to symbols containing reference signals. The candidate set 320 can be represented as '$P_A$' and the further set 322 can be represented as '$P_B$'. The candidate set 320 can include '$P_A \in \{3,2,1,0,-1.77,-3,-4.77,-6\}$'. The further set 322 can include '$P_B \in \{1,2,3,4\}$'. The candidate set 320 can be a semi-static UE-specific parameter.

The approximation module 308 can select one or more values from the candidate set 320, the further set 322, or a combination thereof. The approximation module 308 can reduce the number of candidates for the interference power estimate 150 by selecting one or more values from the candidate set 320, the further set 322, or a combination thereof.

The approximation module 308 can generate a candidate selection 324 as the one or more values selected from the candidate set 320, the further set 322, or a combination thereof.

For example, the approximation module 308 can generate the candidate selection 324 for MIMO communications based on:

$$\rho_A = \begin{cases} P_A + \delta_{power-offset} + 10\log_{10}2, & \text{transmit diversity with 4 antenna ports,} \\ P_A + +\delta_{power-offset}, & \text{otherwise,} \end{cases}$$

Equation (4).

The candidate selection 324 can be represented as '$\rho_A$'. The term '$\delta_{power-offset}$' can represent a system offset value. The system offset value can be based on a transmission mode. The system offset value can be $\delta_{power-offset}=0$ dB for all transmission modes except MU-MIMO where it takes two values 0 or −3 dB. The system offset value can be a UE-specific parameter that can change dynamically.

Continuing with the example, the approximation module 308 can further calculate a selection ratio 326 based on the candidate selection 324. The selection ratio 326 can be based on:

$$\frac{\rho_A}{\rho_B} = \begin{cases} \frac{1}{5}(6-P_B) & \text{one antenna port,} \\ \frac{1}{4}(6-P_B), & \text{2 or 4 antenna ports} \end{cases}$$

Equation (5).

The term '$\rho_B$' can represent a further selection representing a cell-specific value. The approximation module 308 can calculate the selection ratio 326 based on the further set 322.

The approximation module 308 can calculate a signal likelihood 328 using a Gaussian approximation mechanism 330 for calculating the interference power estimate 150. The signal likelihood 328 is an approximate likelihood of the interference power estimate 150 given observation of the receiver signal 124. The signal likelihood 328 can be an approximation of likelihood values for potential values of the interference power estimate 150 given the receiver signal 124.

The Gaussian approximation mechanism 330 is a method or a process for approximating signals or portions of signals using a Gaussian model. The Gaussian approximation mechanism 330 can be an implementation or a utilization of the Gaussian model in approximating a given signal.

The Gaussian approximation mechanism 330 can be represented as an equation. The Gaussian approximation mechanism 330 can be implemented using software, hardware circuitry, such as using gates or arrays, firmware, or a combination thereof.

The Gaussian approximation mechanism 330 can approximate given the receiver signal 124 or a portion therein. For example, the Gaussian approximation mechanism 330 can be utilized for an interference approximation mechanism 332, an overall approximation mechanism 334, or a combination thereof.

The interference approximation mechanism 332 is a method or a process for approximating the interference signal 120. The interference approximation mechanism 332 can use or incorporate the Gaussian approximation mechanism 330 for processing the receiver signal 124. The interference approximation mechanism 332 can be for approximating the interference signal 120 with Gaussian model or behavior.

The overall approximation mechanism 334 is a method or a process for approximating the receiver signal 124 overall. The overall approximation mechanism 334 can use or incorporate the Gaussian approximation mechanism 330. The overall approximation mechanism 334 can be for approximating the whole received signal as Gaussian.

The approximation module 308 can calculate the signal likelihood 328 from the receiver signal 124 based on the Gaussian approximation mechanism 330. The approximation module 308 can calculate the signal likelihood 328 based on the interference approximation mechanism 332, an overall approximation mechanism 334, or a combination thereof. For example, the approximation module 308 can include an interference module 346, an overall module 348, a hybrid module 350, or a combination thereof for calculating the signal likelihood 328.

The interference module 346 is configured to calculate the signal likelihood 328 based on the interference approximation mechanism 332. The interference module 346 can utilize a structure of digital signals. The interference module 346 can utilize or incorporate the Gaussian approximation module 308 for calculating the signal likelihood 328.

The interference module 346 can calculate the signal likelihood 328 using:

$$f_{approx1}(y[k];B) \approx \frac{1}{|C_m|}\sum_{x \in C_m}\frac{1}{\pi^{N_r}\det\left(\sum_{approx1}[k]\right)} \exp\left(-\left\|\sum_{approx1}^{-1/2}[k](y[k]-AH[k]P[k]x)\right\|^2\right).$$

Equation (6).

The term 'B' can represent a given value corresponding to the interference power estimate 150. The term '$C_m$' can represent a set of constellation points of modulation format $m \in \mathcal{M}$ in the complex domain, where $\mathcal{M}$ is the set of candidate modulation formats, and where '$C_m = C_{m_1} \times \ldots \times C_{m_L}$'.

The interference module 346 can calculate the signal likelihood 328 as one or more output likelihood values using Equation (6). Moreover, Equation (6) can include or utilize the interference approximation mechanism 332 for approximating the interference signal 120 therein with the Gaussian model.

The interference module 346 can further calculate an interference covariance value 336 for calculating the signal likelihood 328. The interference covariance value 336 is a representation of covariance relationship for the Gaussian model relative to the receiver interference portion 128. The interference module 346 can calculate the interference covariance value 336 using:

$$\sum_{approx1}[k] = B^2\frac{1}{N_t'}G[k]G^*[k] + \sigma^2 I_{N_T}.$$

Equation (7).

The interference module 346 can further calculate the signal likelihood 328 based on the interference approximation mechanism 332 including a maximum-log approximation mechanism 348. The maximum-log approximation mechanism 348 is a method or a process of estimating one or more parameters of a statistical model to provide one or more estimates for the model's parameters.

The interference module 346 can use the maximum-log approximation mechanism 348 independent of or combined with the Gaussian approximation mechanism 330. The interference module 346 can implement the maximum-log approximation mechanism 348 using:

$$f_{approx1}(y[k]; B) \approx \frac{1}{|C_m|} \frac{1}{\pi^{N_r} \det\left(\sum_{approx1}[k]\right)} \exp\left(-\min_{x \in C_m} \left\|\sum_{approx1}^{-1/2}[k](y[k] - AH[k]P[k]x)\right\|^2\right).$$

Equation (8)

The interference module 346 can use the interference covariance value 336 in calculating the signal likelihood 328 as described in Equation (6) and Equation (8). The interference module 346 can further calculate the interference covariance value 336, the signal likelihood 328, or a combination thereof without the interference signal detail 318. For example, the interference module 346 can calculate the interference covariance value 336, the signal likelihood 328, or a combination thereof without the interference precode 142, layer information for the interference signal 120, content of the interference signal 120 other than the interference reference segment 122, the modulation format of the interference signal 120, or a combination thereof, as seen above in Equations (6)-(8).

It has been discovered that the interference approximation mechanism 332 provides improved accuracy in communicating the serving content. The interference approximation mechanism 332 can accurately characterize the interference signal 120 using the Gaussian model when the receiver serving portion 126 is strong compared to the receiver interference portion 128 and the noise portion 130.

It has further been discovered that the interference approximation mechanism 332 utilizing the Gaussian approximation mechanism 330 and the maximum-log approximation mechanism 348 provides reduced complexity. The Gaussian approximation mechanism 330 provides the ability to process the receiver signal 124 without processing for the interference signal detail 318. Moreover, the maximum-log approximation mechanism 348 to simplify the Gaussian approximation mechanism 330 and remove a summation component.

It has further been discovered that the interference covariance value 336 provides improved efficiency in processing the receiver signal 124. The interference covariance value 336 can accurately estimate covariance values for implementing the Gaussian approximation mechanism 330, resulting in accurate approximations of signals without inappropriate guesses or estimations of the interference signal detail 318.

The overall module 348 is configured to calculate the signal likelihood 328 based on the overall approximation mechanism 334. The overall module 348 can approximate for the overall receiver signal 124, including the receiver serving portion 126, the receiver interference portion 128, the noise portion 130, or a combination thereof. The overall module 348 can calculate the signal likelihood 328 using:

$$f_{approx2}(y[k]; B) \approx \frac{1}{\pi^{N_r} \det\left(\sum_{approx2}[k]\right)} \exp\left(-\left\|\sum_{approx2}^{-1/2}[k]y[k]\right\|^2\right).$$

Equation (9).

The overall module 348 can calculate the signal likelihood 328 as one or more output likelihood values using Equation (9). Moreover, Equation (9) can include or utilize the interference approximation mechanism 332 for approximating the interference signal 120 therein with the Gaussian model.

The overall module 348 can further calculate an overall covariance value 340 for calculating the signal likelihood 328. The overall covariance value 340 is a representation of covariance relationship for the Gaussian model relative to the receiver signal 124 or signals corresponding thereto. The interference module 346 can calculate the interference covariance value 336 using:

$$\sum_{approx2}[k] = $$

Equation (10).

$$A^2 H[k]P[k](H[k]P[k])^* + B^2 \frac{1}{N_t'} G[k]G^*[k] + \sigma^2 I_{N_T}.$$

The overall module 348 can use the overall covariance value 340 in calculating the signal likelihood 328 as described in Equation (9). The overall module 348 can further calculate the overall covariance value 340, the signal likelihood 328, or a combination thereof without the interference signal detail 318. For example, the overall module 348 can calculate the overall covariance value 340, the signal likelihood 328, or a combination thereof without the interference precode 142, layer information for the interference signal 120, content of the interference signal 120 other than the interference reference segment 122, the modulation format of the interference signal 120, or a combination thereof, as seen above in Equation (9) and Equation (10).

The overall module 348 can further can calculate the signal likelihood 328 without modulation formats of both the serving signal 110 and the interference signal 120. The overall module 348 can ignore the modulation formats since the signals are approximated as Gaussian.

It has been discovered that the overall approximation mechanism 334 provides improved accuracy in communicating the serving content. The overall approximation mechanism 334 can accurately characterize the receiver signal 124 using the Gaussian model when the receiver serving portion 126 is weak compared to the receiver interference portion 128 and the noise portion 130.

It has further been discovered that the overall covariance value 340 provides improved efficiency in processing the receiver signal 124. The overall covariance value 340 can accurately estimate covariance values for implementing the Gaussian approximation mechanism 330, resulting in accurate approximations of signals without inappropriate guesses or estimations of the interference signal detail 318.

The hybrid module 350 is configured to utilize both the interference approximation mechanism 332 and the overall approximation mechanism 334 in processing the receiver signal 124. The hybrid module 350 can calculate a signal-interference measure 344 from the receiver signal 124. The signal-interference measure 344 is a representation of a relationship between portions within received signal or data for all channels. The signal-interference measure 344 can represent a quotient or a ratio between portions within the receiver signal 124.

For example, the signal-interference measure 344 can be based on the receiver serving portion 126, the receiver interference portion 128, the noise portion 130, or a combination thereof. Also for example, the signal-interference measure 344 can be based on a desired portion and an undesirable portion, such as including an interference signal or noise, within the receiver signal 124.

The hybrid module 350 can calculate the signal-interference measure 344 based on:

$$SINR[k] = \frac{A^2 \|H[k]P[k]\|_F^2}{B^2 \frac{1}{N_t'} \|G[k]\|_F^2 + N_r \sigma^2}. \quad \text{Equation (11).}$$

Since the interference power estimate 150 and the interference signal detail 318 are not known, the second moment estimate 316 can be used instead of the interference signal detail 318 or the interference amplitude offset 148 represented as 'B'. The hybrid module 350 can use:

$$SINR[k] = \frac{A^2 \|H[k]P[k]\|_F^2}{\hat{B}_{2nd\ moment}^2 \frac{1}{N_t'} \|G[k]\|_F^2 + N_r \sigma^2}. \quad \text{Equation (12).}$$

For illustrative purposes the signal-interference measure 344 is described as an instantaneous value of a signal-to-interference-plus-noise ratio (SINR). However, it is understood that the signal-interference measure 344 can be different, such as a signal-to-interference ratio (SIR).

The hybrid module 350 can calculate the signal likelihood 328 using a selection mechanism 342 for selecting between the interference approximation mechanism 332 and the overall approximation mechanism 334. The selection mechanism 342 can include a process or a method for selecting different mechanisms based on certain conditions.

The hybrid module 350 can use the selection mechanism 342 to select between the interference approximation mechanism 332 and the overall approximation mechanism 334. The hybrid module 350 can further include the selection mechanism 342 including a condition or a threshold for selecting the interference approximation mechanism 332 and the overall approximation mechanism 334.

The hybrid module 350 can implement the interference approximation mechanism 332 for the signal-interference measure 344 over a threshold as described by the selection mechanism 342. The hybrid module 350 can implement the overall approximation mechanism 334 for the signal-interference measure 344 below the threshold as described by the selection mechanism 342.

The selection mechanism 342 can be represented as:

$$f_{hybrid}(y[k]; B) = \begin{cases} f_{approx1}(y[k]; B), & SINR[k] > \theta, \\ f_{approx2}(y[k]; B), & \text{otherwise} \end{cases}. \quad \text{Equation (13).}$$

The term '$f_{approx1}$' can represent the interference approximation mechanism 332. The term '$f_{approx2}$' can represent the overall approximation mechanism 334. The choice for '$\theta$' can be heuristic.

It has been discovered that the selection mechanism 342 for implementing the interference approximation mechanism 332 and the overall approximation mechanism 334 provides increased accuracy for processing the receiver signal 124. The selection mechanism 342 can optimize the benefits of interference approximation mechanism 332 and the overall approximation mechanism 334 by choosing appropriate mechanism based on the SINR.

It has further been discovered that the approximation module 308 utilizing the Gaussian approximation mechanism 330 and without the interference signal detail 318 to process the receiver signal 124 provides increased accuracy and efficiency. The interference signal detail 318 would not readily be able for an unintended recipient of the interference signal 120. Utilizing the Gaussian approximation mechanism 330 to approximate signals provides accurate approximations of signals without using inaccurate estimations or guesses for the interference signal detail 318.

The approximation module 308 can calculate the signal likelihood 328 as a result of implementing or executing the interference approximation mechanism 332 or the overall approximation mechanism 334. The approximation module 308 can calculate the signal likelihood 328 using the first communication unit 216, the second communication unit 237, the first control unit 212, the second control unit 234, or a combination thereof. The approximation module 308 can store the signal likelihood 328 in the first communication unit 216, the second communication unit 236, the first storage unit 214, the second storage unit 246, or a combination thereof.

After calculating the signal likelihood 328, the control flow can be passed to the power estimate module 310. The control flow can pass similarly as described above between the receiver module 302 and the channel estimate module 304, but using the processing results of the initialization module 306, such as the signal likelihood 328.

The power estimate module 310 is configured to calculate the interference power estimate 150 based on the receiver signal 124. The power estimate module 310 can calculate the interference power estimate 150 corresponding to the receiver interference portion 128, the interference signal 120, or a combination thereof.

The power estimate module 310 can calculate the interference power estimate 150 based on the signal likelihood 328 for characterizing the interference signal 120. The power estimate module 310 can calculate the interference power estimate 150 based on maximizing the signal likelihood 328. For example, the power estimate module 310 can use a Log-MAP mechanism or a minimum mean square error (MMSE) mechanism to calculate the value maximizing the signal likelihood 328.

For example, the power estimate module 310 can calculate the interference power estimate 150 based on:

$$\hat{B} = \frac{\sum_{B \in S} B \prod_{k=1}^{K} f_{hybrid}(y[k]; B)}{\sum_{B \in S} \prod_{k=1}^{K} f_{hybrid}(y[k]; B)} \\ = \frac{\sum_{B \in S} B \exp\left(\sum_{k=1}^{K} \log f_{hybrid}(y[k]; B)\right)}{\sum_{B \in S} \exp\left(\sum_{k=1}^{K} \log f_{hybrid}(y[k]; B)\right)}. \quad \text{Equation (14).}$$

The term '$f_{hybrid}$' can represent the selection mechanism 342 utilizing the interference approximation mechanism 332 and the overall approximation mechanism 334.

Equation (14) can be further simplified using the second moment estimate 316. Moreover, a set 'V' can include selected elements of 'S', as based on the candidate set 320, the further set 322, the candidate selection 324, or a combination thereof that are closest to the second moment estimate 316. The power estimate module 310 can further use:

$$\hat{B} = \frac{\sum_{B \in V} B \exp\left(\sum_{k=1}^{K} \log f_{hybrid}(y[k]; B)\right)}{\sum_{B \in V} \exp\left(\sum_{k=1}^{K} \log f_{hybrid}(y[k]; B)\right)}. \qquad \text{Equation (15).}$$

The power estimate module 310 can use the first communication unit 216, the second communication unit 237, the first control unit 212, the second control unit 234, or a combination thereof to calculate the interference power estimate 150. The initialization module 306 can store the interference power estimate 150 in the first communication unit 216, the second communication unit 236, the first storage unit 214, the second storage unit 246, or a combination thereof.

After calculating the second moment estimate 316, the control flow can be passed to the subsequent process module 312. The control flow can pass similarly as described above between the receiver module 302 and the channel estimate module 304, but using the processing results of the initialization module 306, such as the interference power estimate 150.

The subsequent process module 312 is configured to process for the serving signal 110 and the serving content therein. The subsequent process module 312 can process the receiver interference portion 128, such as by removing or whitening the receiver interference portion 128. The subsequent process module 312 can further interleave, de-interleave, detect, decode, or a combination thereof for the receiver serving portion 126. The subsequent process module 312 can further perform joint detection-decoding for both the receiver serving portion 126 and the receiver interference portion 128.

The subsequent process module 312 estimate the serving signal 110, the serving content therein, or a combination thereof. During the process, the subsequent process module 312 can determine detail information regarding the serving signal 110, including the serving amplitude offset 146, the serving precode 140, the modulation scheme, or a combination thereof.

The detail information regarding the serving signal 110 can be passed to the serving detail module 314. The serving detail module 314 can store the detail information regarding the serving signal 110 and provide it to the approximation module 308 for subsequent iterations. The computing system 100 can further use the detail information regarding the serving signal 110 as determined by the channel estimate module 304.

Figure 4:
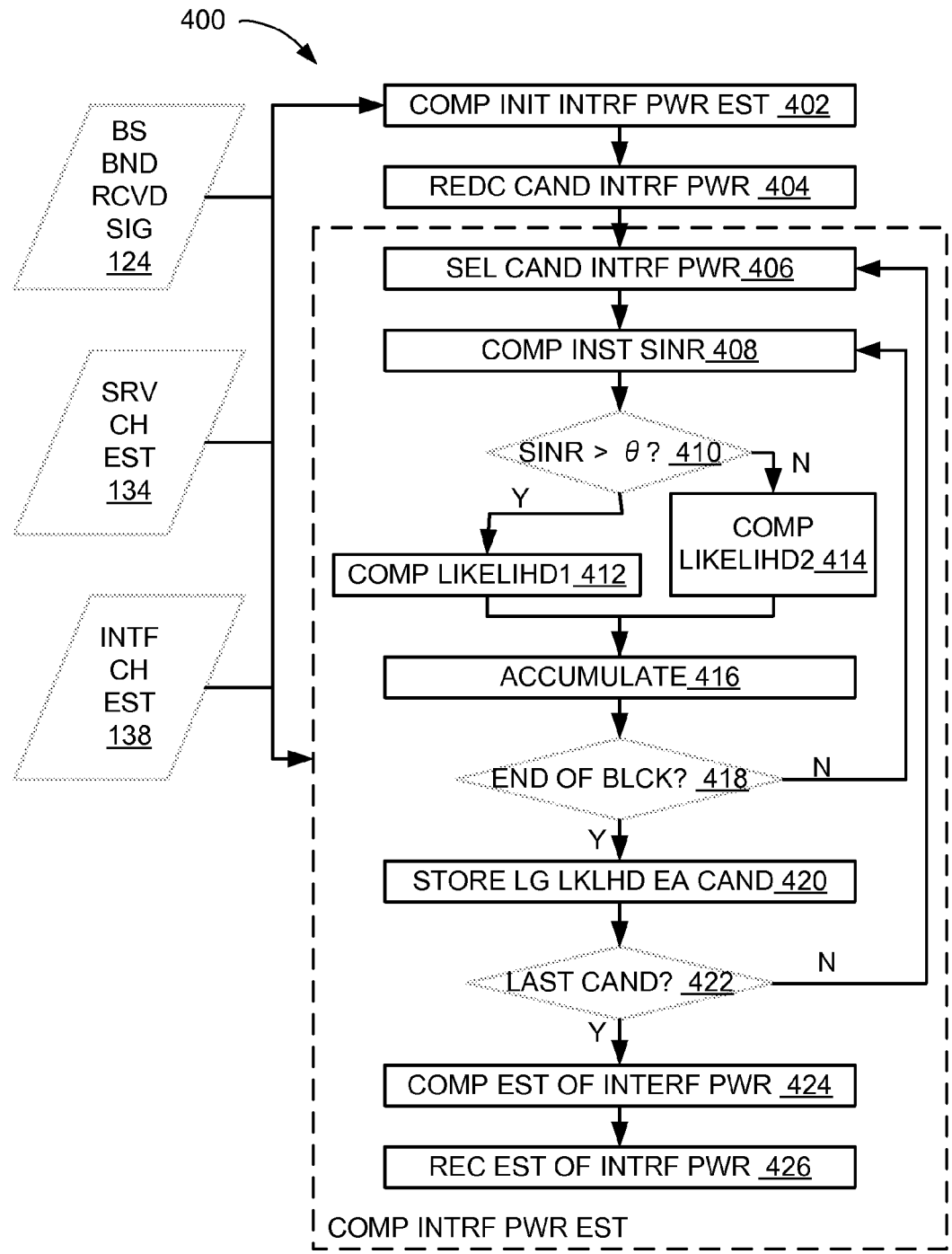
FIG. 4 is an exemplary operational flowchart of the computing system of FIG. 1.

Referring now to FIG. 4, therein is shown an exemplary operational flowchart 400 of the computing system of 100 FIG. 1. The computing system 100 can use the receiver signal 124, the serving channel estimate 134, the interference channel estimate 138, or a combination thereof for executing the exemplary operational flowchart 400. The computing system 100 can further execute the exemplary operational flowchart 400 without the interference signal detail 318 of FIG. 3.

The exemplary operational flowchart 400 can include computing initial interference power estimate in a box 402. The computing system 100 can compute the initial interference power estimate by calculating the second moment estimate 316 of FIG. 3. The computing system 100 can use the initialization module 306 of FIG. 3 to calculate the second moment estimate 316 as described above.

The exemplary operational flowchart 400 can further include reducing candidate interference power in a box 404. The computing system 100 can reduce the candidate interference power based on analyzing the candidate set 320 of FIG. 3, the further set 322 of FIG. 3, the candidate selection 324 of FIG. 3, the selection ratio 326 of FIG. 3, or a combination thereof. The computing system 100 can use the approximation module 308 to reduce the candidate interference power. The approximation module 308 can further reduce based on comparing the candidate set 320, the further set 322, the candidate selection 324, the selection ratio 326, or a combination thereof to the second moment estimate 316.

The exemplary operational flowchart 400 can further include selecting one candidate interference power in a box 406. The computing system 100 can use the approximation module 308 to select one instance of the candidate interference power from the reduced set from the step described in the box 404, such as from a reduced instance of the candidate set 320, the further set 322, or a combination thereof.

The exemplary operational flowchart 400 can further include computing an instantaneous SINR in a box 408. The computing system 100 can use the hybrid module 350 of FIG. 3 to calculate the signal-interference measure 344 of FIG. 3 as described above for computing the instantaneous SINR.

The exemplary operational flowchart 400 can further include comparing the instantaneous SINR to a threshold in a box 410. The computing system 100 can use the hybrid module 350 to compare the instantaneous SINR by processing the signal-interference measure 344 according to the selection mechanism 342 of FIG. 3 as described above.

The exemplary operational flowchart 400 can further include computing likelihood 1 in a box 412 and computing likelihood 2 in a box 414. The computing system 100 can use the interference module 346 of FIG. 3 to compute likelihood 1 by calculating the signal likelihood 328 using the interference approximation mechanism 332 of FIG. 3 incorporating the Gaussian approximation mechanism 330 of FIG. 3, the maximum-log approximation mechanism 348 of FIG. 3, or a combination thereof.

The computing system 100 can use the overall module 348 of FIG. 3 to compute likelihood 2 by calculating the signal likelihood 328 using the overall approximation mechanism 334 of FIG. 3 incorporating the Gaussian approximation mechanism 330, the maximum-log approximation mechanism 348, or a combination thereof. The computing system 100 can use the hybrid module 350 to implement the overall module 348 or the interference module 346 according to the selection mechanism 342.

The exemplary operational flowchart 400 can further include accumulating in a box 416. The computing system 100 can accumulate by storing one or more processing results, including the signal likelihood 328 or the interference power estimate 150 of FIG. 3 resulting therefrom, corresponding to the candidate interference power from the step represented in the box 406. The computing system 100 can accumulate by storing in the first communication unit 216 of FIG. 2, the second communication unit 236 of FIG. 2, the first storage unit 214 of FIG. 2, the second storage unit 246 of FIG. 2, or a combination thereof.

The exemplary operational flowchart 400 can further include determining end of block in a box 418. The computing system 100 can use the power estimate module 310 of FIG. 3, the subsequent process module 312 of FIG. 3, or a combination thereof to determine an end of a communication block regarding the receiver signal 124. The computing system 100 can repeat the steps represented in the boxes 408-418 until the end of the communication block.

The exemplary operational flowchart 400 can further include storing log-likelihood for each candidate interference power in a box 420. The computing system 100 can use the first communication unit 216, the second communication unit 236, the first storage unit 214, the second storage unit 246, or a combination thereof to store the log-likelihood values.

The exemplary operational flowchart 400 can further include determining last interference power candidate in a box 422. The computing system 100 can use the approximation module 308, the power estimate module 310, the subsequent process module 312, or a combination thereof to determine the progress of estimations for the values in the candidate set determined by the step represented in the box 404. The computing system 100 can repeat the steps represented in the boxes 406-422 until all of the values in the candidate set have been processed.

The exemplary operational flowchart 400 can further include computing estimate of interference power in a box 424. The computing system 100 can compute the estimate by calculating the interference power estimate 150 with the power estimate module 310 as described above. The computing system 100 can use the MMSE mechanism to calculate the interference power estimate 150.

The exemplary operational flowchart 400 can further include recording estimate of interference power estimate in a box 426. The computing system can record by storing the interference power estimate 150 in the first communication unit 216, the second communication unit 236, the first storage unit 214, the second storage unit 246, or a combination thereof.

Figure 5:
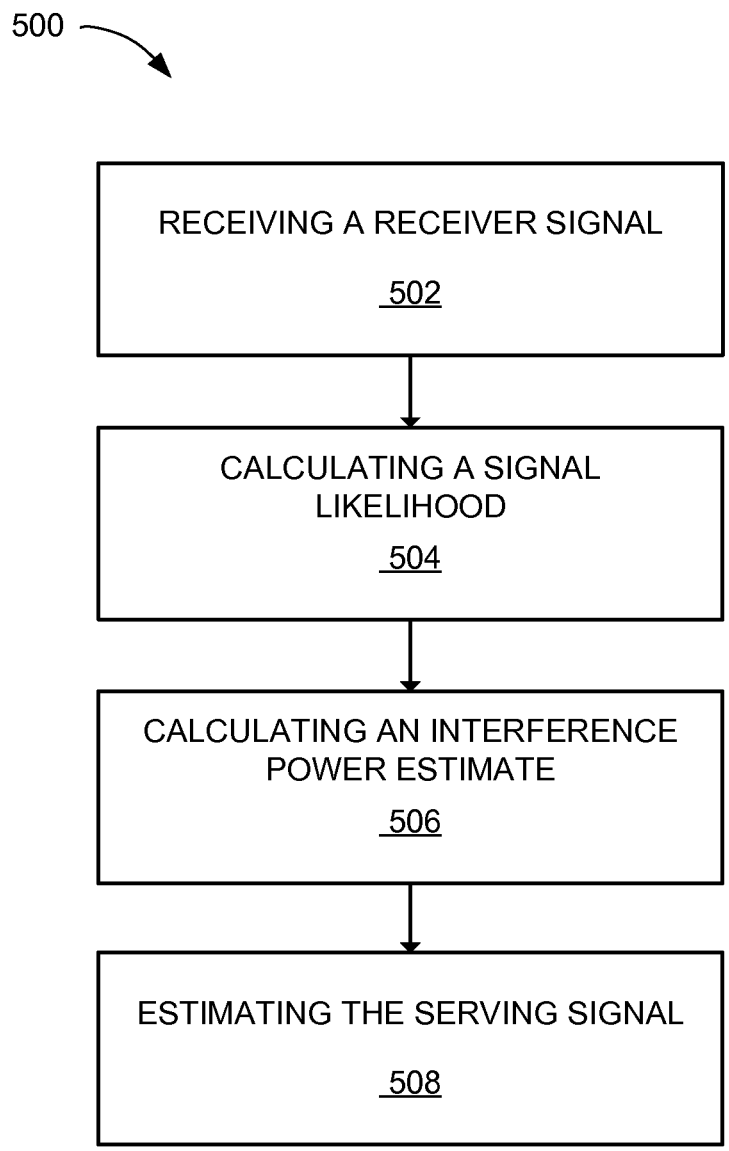
FIG. 5 is a flow chart of a method of operation of a computing system in a further embodiment of the present invention.

Referring now to FIG. 5, therein is shown a flow chart 500 of a method of operation of a computing system in a further embodiment of the present invention. The method 500 includes: receiving a receiver signal for representing a serving signal and an interference signal in a block 502; calculating a signal likelihood with a communication unit from the receiver signal based on a Gaussian approximation mechanism in a block 504; calculate an interference power estimate based on the signal likelihood for characterizing the interference signal in a block 506; and estimating the serving signal based on the interference power estimate in a block 508.

The modules described in this application can be hardware implementation or hardware accelerators, including passive circuitry, active circuitry, or both, in the first communication unit 216 of FIG. 2, the second communication unit 236 of FIG. 2, the first control unit 216 of FIG. 2, the second control unit 238 of FIG. 2, or a combination thereof. The modules can also be hardware implementation or hardware accelerators, including passive circuitry, active circuitry, or both, within the first device 102 of FIG. 1 or the second device 106 of FIG. 2, but outside of the first communication unit 216, the second communication unit 236, the first control unit 216, the second control unit 238, or a combination thereof.

The computing system 100 of FIG. 1 has been described with module functions or order as an example. The computing system 100 can partition the modules differently or order the modules differently. For example, the functions of the approximation module 308 of FIG. 3 can be combined with the initialization module 306 of FIG. 3 or the power estimate module 310 of FIG. 3. Also for example, the serving detail module 314 of FIG. 3 can be a sub-module within the subsequent process module 312 of FIG. 3.

For illustrative purposes, the various modules have been described as being specific to the first device 102 or the second device 106. However, it is understood that the modules can be distributed differently. For example, the various modules can be implemented in a different device, or the functionalities of the modules can be distributed across multiple devices. Also as an example, the various modules can be stored in a non-transitory memory medium As a more specific example, one or more modules described above can be stored in the non-transitory memory medium for distribution to a different system, a different device, a different user, or a combination thereof, for manufacturing, or a combination thereof. Also as a more specific example, the modules described above can be implemented or stored using a single hardware unit, such as a chip or a processor, or across multiple hardware units.

The modules described in this application can be stored in the non-transitory computer readable medium. The first communication unit 216, the second communication unit 236, the first storage unit 214, the second storage unit 246, or a combination thereof can represent the non-transitory computer readable medium. The first communication unit 216, the second communication unit 236, first storage unit 214, the second storage unit 246, or a combination thereof, or a portion therein can be removable from the first device 102, the second device 106, or a combination thereof. Examples of the non-transitory computer readable medium can be a non-volatile memory card or stick, an external hard disk drive, a tape cassette, or an optical disk.

The physical transformation from the Gaussian approximation mechanism 330 of FIG. 1 of the receiver signal 124 FIG. 1 results in the movement in the physical world, such as content displayed or recreated for the user on the first device 102 from processing the serving content. The content reproduced on the first device 102, such as navigation information or voice signal of a caller, can influence the user's movement, such as following the navigation information or replying back to the caller. Movement in the physical world results in changes to the channel estimates, the interference source 118 FIG. 1, the interference signal 120 FIG. 1, or the noise portion 130 of FIG. 1, which can be fed back into the computing system 100 and influence the signal likelihood 328 FIG. 1 and the interference power estimate 150 FIG. 1.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A communication system comprising:
an antenna configured to receive a receiver signal for representing a serving signal and an interference signal;
a communication unit, coupled to the antenna, configured to:
calculate a set of approximate likelihood values corresponding to potential instances of an interference power estimate from the receiver signal based on a Gaussian approximation mechanism, the set of approximate likelihood values calculated based on a second moment estimate for the interference power estimate; calculate the interference power estimate based on the set of approximate likelihood corresponding to potential instances of the interference power estimate; and estimating the serving signal based on the interference power estimate.

2. The system as claimed in claim 1 wherein the communication unit is configured to calculate the set of approximate likelihood values based on an interference approximation mechanism, an overall approximation mechanism, or a combination thereof.

3. The system as claimed in claim 1 wherein the communication unit is configured to calculate an interference covariance value for calculating the set of approximate likelihood values.

4. The system as claimed in claim 1 wherein the communication unit is configured to calculate an overall covariance value for calculating the set of approximate likelihood values.

5. The system as claimed in claim 1 wherein the communication unit is configured to calculate the set of approximate likelihood values using a selection mechanism for selecting between an interference approximation mechanism and an overall approximation mechanism.

6. The system as claimed in claim 1 wherein the communication unit is configured to: calculate a signal-interference measure from the receiver signal; implement an interference approximation mechanism for the signal-interference measure over a threshold.

7. The system as claimed in claim 1 wherein the communication unit is configured to: calculate a signal-interference measure from the receiver signal; implement an overall approximation mechanism for the signal-interference measure below a threshold.

8. The system as claimed in claim 1 wherein the communication unit is configured to calculate the set of approximate likelihood values for the interference power estimate based on the Gaussian approximation mechanism combined with a maximum-log approximation mechanism.

9. The system of claim 1 wherein the communication unit is configured to calculate the set of approximate likelihood values without using interference signal detail for representing the interference signal.

10. A method of operation of a computing system comprising: receiving a receiver signal for representing a serving signal and an interference signal; calculating a with a communication unit a set of approximate likelihood values corresponding to potential instances of an interference power estimate from the receiver signal based on a Gaussian approximation mechanism, the set of approximate likelihood values calculated based on a second moment estimate for initializing the interference power estimate; calculating an interference power estimate based on the set of approximate likelihood values corresponding to potential instances of the interference power estimate; and estimating the serving signal based on the interference power estimate.

11. The method as claimed in claim 10 wherein calculating the set of approximate likelihood values includes calculating the set of approximate likelihood values based on an interference approximation mechanism, an overall approximation mechanism, or a combination thereof.

12. The method as claimed in claim 10 wherein calculating the set of approximate likelihood values includes calculating an interference covariance value.

13. The method as claimed in claim 10 wherein calculating the set of approximate likelihood values includes calculating an overall covariance value.

14. The method as claimed in claim 10 wherein calculating the set of approximate likelihood values includes calculating the set of approximate likelihood values using a selection mechanism for selecting between an interference approximation mechanism and an overall approximation mechanism.

15. A non-transitory computer readable medium including instructions for a computing system comprising: receiving a receiver signal for representing a serving signal and an interference signal; calculating with a communication unit a set of approximate likelihood values corresponding to potential instances of an interference power estimate from the receiver signal based on a Gaussian approximation mechanism, the set of approximate likelihood values calculated based on a second moment estimate for initializing the interference power estimate; calculating an interference power estimate based on the set of approximate likelihood values corresponding to potential instances of the interference power estimate; and estimating the serving signal based on the interference power estimate.

16. The non-transitory computer readable medium as claimed in claim 15 wherein calculating the set of approximate likelihood values includes calculating the set of approximate likelihood values based on an interference approximation mechanism, an overall approximation mechanism, or a combination thereof.

17. The non-transitory computer readable medium as claimed in claim 15 wherein calculating the set of approximate likelihood values includes calculating an interference covariance value.

18. The non-transitory computer readable medium as claimed in claim 15 wherein calculating the set of approximate likelihood values includes calculating an overall covariance value.

19. The non-transitory computer readable medium as claimed in claim 15 wherein calculating the set of approximate likelihood values includes calculating the set of approximate likelihood values using a selection mechanism for selecting between an interference approximation mechanism and an overall approximation mechanism.

* * * * *